(12) United States Patent
Roeder et al.

(10) Patent No.: US 8,485,722 B1
(45) Date of Patent: Jul. 16, 2013

(54) SUBSURFACE TEMPERATURE MEASUREMENT SYSTEM

(75) Inventors: Robert S. Roeder, Dunedin, FL (US); Thomas M. Weller, Lutz, FL (US); Paul A. Herzig, St. Petersburg, FL (US)

(73) Assignee: Raytheon Company, Waltham, MA (US)

( * ) Notice: Subject to any disclaimer, the term of this patent is extended or adjusted under 35 U.S.C. 154(b) by 460 days.

(21) Appl. No.: 12/904,855

(22) Filed: Oct. 14, 2010

Related U.S. Application Data

(60) Provisional application No. 61/251,553, filed on Oct. 14, 2009.

(51) Int. Cl.
*G01J 5/00* (2006.01)
(52) U.S. Cl.
USPC .......................................... 374/122
(58) Field of Classification Search
USPC .......................................... 374/122
See application file for complete search history.

(56) References Cited

U.S. PATENT DOCUMENTS

| | | | | |
|---|---|---|---|---|
| 5,005,015 A | 4/1991 | Dehn et al. | ..................... | 340/962 |
| 5,942,899 A | 8/1999 | Shrekenhamer et al. | ..... | 324/326 |
| 5,949,845 A * | 9/1999 | Sterzer | ........................... | 378/37 |
| 6,137,440 A | 10/2000 | Roeder et al. | ................. | 342/351 |
| 6,217,210 B1 | 4/2001 | Roeder et al. | ..................... | 374/1 |
| 6,439,763 B2 | 8/2002 | Roeder et al. | ..................... | 374/1 |
| 6,834,991 B2 | 12/2004 | Roeder | .............................. | 374/1 |
| 6,837,617 B1 * | 1/2005 | Koltunov et al. | ............ | 374/121 |
| 6,967,612 B1 | 11/2005 | Gorman et al. | ................. | 342/22 |
| 7,019,641 B1 | 3/2006 | Lakshmanan et al. | ........ | 340/538 |
| 2004/0057496 A1 * | 3/2004 | Roeder | ......................... | 374/129 |
| 2004/0267115 A1 * | 12/2004 | Carr | .............................. | 600/433 |
| 2005/0122254 A1 * | 6/2005 | Ammar | ......................... | 342/174 |
| 2007/0024268 A1 * | 2/2007 | Ammar | ...................... | 324/76.14 |
| 2007/0299488 A1 * | 12/2007 | Carr | .............................. | 607/101 |
| 2008/0246669 A1 | 10/2008 | Roeder et al. | ................. | 343/703 |

OTHER PUBLICATIONS

"Infrared Thermometer"; htpp://en.wikipedia.org/wiki/infrared_thermometer (4 pgs), printed Jul. 19, 2011.

* cited by examiner

*Primary Examiner* — Lisa Caputo
*Assistant Examiner* — Jamel Williams
(74) *Attorney, Agent, or Firm* — Cantor Colburn LLP (57) ABSTRACT

According to certain embodiments, a temperature measurement system includes a radiometer coupled to an antenna and a signal processor. The radiometer is operable to generate two or more signals representing electro-magnetic radiation received at a corresponding two or more differing frequencies. The signal processor receives the two or more signals from the radiometer while the antenna is placed adjacent to a surface of a substrate, and compares the two or more signals with one another to determine a brightness temperature of the substrate at a depth of the substrate from the antenna.

25 Claims, 3 Drawing Sheets

SUBSURFACE TEMPERATURE MEASUREMENT SYSTEM

RELATED APPLICATIONS

This application claims the benefit under 35 U.S.C. §119 (e) of the priority of U.S. Provisional Patent Application Ser. No. 61/251,553, entitled "Subsurface Temperature Measurement System," filed Oct. 14, 2009, the entire disclosure of which is hereby incorporated by reference.

TECHNICAL FIELD OF THE INVENTION

This disclosure generally relates to measurement devices, and more particularly, to a subsurface temperature measurement system.

BACKGROUND OF THE INVENTION

Radiometers are used to measure electro-magnetic radiation emitted from remote objects. Radiometers that measure electro-magnetic radiation in the microwave and millimeter frequency range are commonly referred to as microwave and millimeter wave (MMW) radiometers, respectively.

SUMMARY OF THE INVENTION

According to certain embodiments, a temperature measurement system includes a radiometer coupled to an antenna and a signal processor. The radiometer is operable to generate two or more signals representing electro-magnetic radiation received at a corresponding two or more differing frequencies. The signal processor receives the two or more signals from the radiometer while the antenna is placed adjacent to a surface of a substrate, and compares the two or more signals with one another to determine a brightness temperature of the substrate at a depth of the substrate from the antenna.

Certain embodiments of the present disclosure may provide one or more technical advantages. For example, embodiments of the present disclosure may reduce ambiguity in measurements that can occur with radiometers operating at a single frequency. Embodiments of the subsurface temperature measurement system combine signals from the radiometer at differing frequencies to compensate for variations in electro-magnetic propagation due to various factors, potentially including resistivity of the substrate, reluctance of the substrate, and/or extraneous objects embedded in the substrate that may yield ambiguity in the resulting temperature measurements.

The reduced ambiguity provided by certain embodiments of subsurface temperature measurement system may yield enhanced utility for subsurface temperature measurement. As a particular example, the antenna may be configured in a boot worn by a fireman such that the subsurface temperature measurement system may be used to determine subsurface temperatures below a substrate, such as the Earth, when combating forest fires. The fireman may walk over areas that are susceptible to underground fires and record temperatures at each step while performing other work. The U.S. Department of Agriculture (USDA) cites underground fires as difficult to locate, destructive, and difficult to control. Firemen often continue to battle underground fires long after they have extinguished surface fires and crown fires from the tops of trees. Embodiments of the present disclosure may be configured in a surface contacting device such as a boot to determine ongoing fires in the ground by measuring subsurface temperatures below the surface of the Earth.

As another particular example, the antenna may be configured in a shoe worn by a an astronaut to determine subsurface temperatures below the surface of an extra-terrestrial planet such as the Moon or the planet Mars. In this manner, the subsurface temperature measurement system may be used to measure brightness temperatures below the surface of the extra-terrestrial planet to determine the presence of ice or other water-borne subsurface formations. The National Aeronautics and Space Administration (NASA) exploratory Moon-to-Mars Mission supports the detection and location of subsurface ice and/or water on the dark side of the Moon and on the surface of Mars. As Astronauts walk the surface of the planets, they could potentially locate and map near subsurface fields of ice and/or water while they conduct other scheduled work.

As another particular example, the antenna may be configured in a suitable housing for placement against a man-made structure, such as a building, for measuring brightness temperatures inside the man-made structure. In this particular example, the antenna, radiometer, and signal processor may be configured in a hand-held housing that may be placed in direct contact with the walls or other outer surface of man-made structure such that brightness temperatures associated with humans or other hot/cold bodies inside the building may be detected.

As another particular example, the antenna may be configured in a moving robot that may move over terrain that is generally inaccessible by humans, such as on extra-terrestrial planets or proximate an active volcano. The majority of Earth's volcanism happens underwater and may cover a relatively large area. Thus, measurement over any of these areas with a hand-held or foot or boot mounted sensor may have limitations. Certain embodiments of the subsurface temperature measurement system may receive signals from the antenna configured on a moving robot to remotely measure extra-terrestrial planets or thermal volcanic activity by measuring subsurface temperatures below the surface of the Earth or other planetary body.

Certain embodiments of the present disclosure may provide some, all, or none of these advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of embodiments of the present disclosure and the features and advantages thereof, reference is made to the following description taken in conjunction with the accompanying drawings, in which.

DETAILED DESCRIPTION OF THE INVENTION

Figure 1:
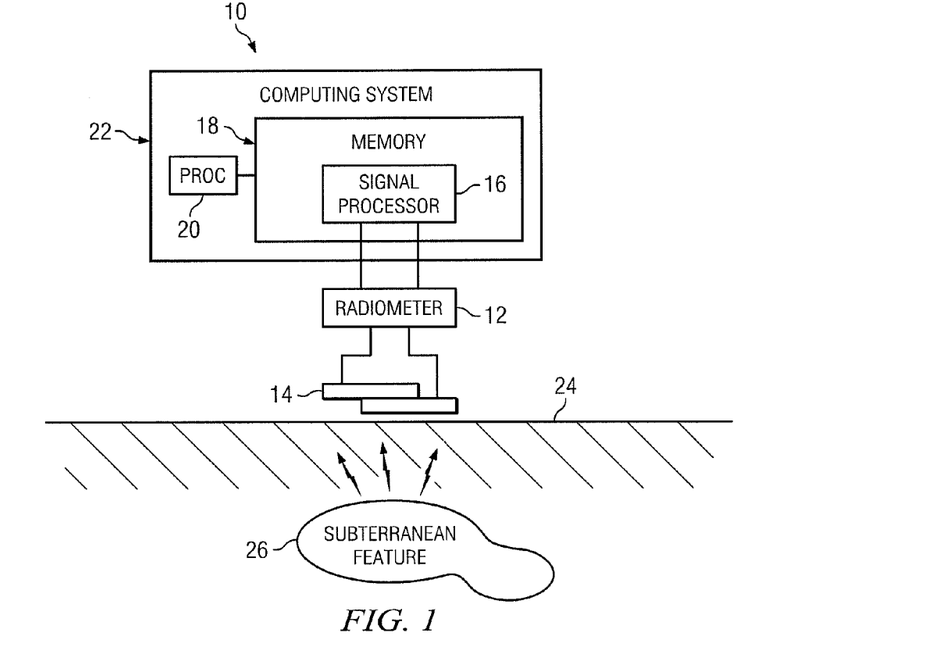
FIG. 1 illustrates an example subsurface temperature measurement system according to certain embodiments of the present disclosure.

FIG. 1 illustrates an example subsurface temperature measurement system 10 according to certain embodiments of the present disclosure. Subsurface temperature measurement system 10 includes a radiometer that is coupled to an antenna 14 and a signal processor 16. Signal processor 16 may be stored in a memory 18 and executed by a processor 20 of a computing system 22. When antenna 14 is placed adjacent to or in contact with a surface of a suitable substrate 24, signal processor 16 combines the radiometric signals from radiometer 12 to determine brightness temperatures of certain features 26 below the surface of substrate 24. The term "adjacent to" for purposes of this description may be any distance of antenna 14 from substrate 24 in which radiometer 12 may generate radiometric signals of sufficient quality for determining brightness temperatures below the surface of substrate 24.

Microwave and millimeter wave radiometers may be useful for measuring brightness temperatures of remote objects that naturally generate electro-magnetic energy in proportion to their intrinsic thermal energy. As such, microwave and/or millimeter wave (MMW) radiometers are generally useful for determining brightness temperatures (BT) of remote objects. Devices that remotely measure brightness temperatures using infrared radiation have been developed. These devices, however, are only well suited for measuring the brightness temperatures at the surface of objects due to the relatively short penetration depth of radiation in the infrared frequency range.

Certain embodiments of the present disclosure may provide one or more technical advantages. For example, embodiments of the present disclosure may reduce ambiguity in measurements that can occur with radiometers operating at a single frequency. Embodiment of the subsurface temperature measurement system 10 combine signals from radiometer 12 at differing frequencies to compensate for variations in electro-magnetic propagation due to various factors, potentially including resistivity of the substrate, reluctance of the substrate, and/or extraneous objects embedded in the substrate that may yield ambiguity in the resulting measurements.

The reduced ambiguity provided by certain embodiments of subsurface temperature measurement system 10 may yield enhanced utility for subsurface temperature measurement. As a particular example, antenna 14 may be configured in a boot worn by a fireman such that subsurface temperature measurement system 10 may be used to determine subsurface temperatures below a substrate 24, such as the Earth when combating forest fires. The fireman may walk over areas that are susceptible to underground fires and record temperatures at each step while performing other work. The U.S. Department of Agriculture (USDA) cites underground fires as difficult to locate, destructive, and difficult to control. Firemen often continue to battle underground fires long after they have extinguished surface fires and crown fires from the tops of trees. Embodiments of the present disclosure may be configured in a surface contacting device such as a boot to determine ongoing fires in the ground by measuring subsurface temperatures below the surface of the Earth.

As another particular example, antenna 14 may be configured in a shoe worn by an astronaut to determine subsurface temperatures below the surface of an extra-terrestrial planet such as the Moon or the planet Mars. In this manner, subsurface temperature measurement system 10 may be used to measure brightness temperatures below the surface of the extra-terrestrial planet to determine the presence of ice or other water-borne subsurface formations. The National Aeronautics and Space Administration (NASA) exploratory Moon-to-Mars Mission supports the detection and location of subsurface ice and/or water on the dark side of the Moon and on the surface of Mars. As Astronauts walk the surface of the planets, they could potentially locate and map near subsurface fields of ice and/or water while they conduct other scheduled work.

As another particular example, antenna 14 may be configured in a suitable housing for placement against a man-made structure, such as a building for measuring brightness temperatures inside the man-made structure. In this example, antenna 14, radiometer 12, and signal processor 16 may be configured in a hand-held housing that may be placed in direct contact with the walls or other outer surface of man-made structure such that brightness temperatures associated with humans or other hot/cold bodies inside the building may be detected.

As another particular example, antenna 14 may be configured in a moving robot that may move over terrain that is generally inaccessible by humans, such as on extra-terrestrial planets or proximate an active volcanoes. The majority of Earth's volcanism happens underwater and may cover a relatively large area. Thus, measurement over any of these areas with a hand-held or foot or boot mounted sensor may have limitations. Certain embodiments of subsurface temperature measurement system 10 may receive signals from antenna 14 configured on a moving robot to remotely measure extra-terrestrial planets or thermal volcanic activity by measuring subsurface temperatures below the surface of the Earth or other planetary body.

As another particular example, subsurface temperature measurement system 10 may be operable to detect and classify coal fires burning underneath the surface of the Earth. As another particular example, subsurface temperature measurement system 10 may be operable to measure temperatures of ice beneath the surface of frozen lakes, rivers, and/or ice rinks. As another particular example, subsurface temperature measurement system 10 may be operable to measure temperatures internal to the human body or other living animal.

As another particular example, subsurface temperature measurement system 10 may be operable to detect underground water leaks in water containing devices such as storage tanks, water pipes, septic tanks, and the like. In this particular example signal processor 16 may compare received temperature values from radiometers 12 at various underground locations around the water containing devices at determine the presence of water leaks due to changes in brightness temperature and/or changes in reluctance and resistivity of the soil caused by the presence of water.

Radiometer 12 receives two or more electrical signals from antenna 14 representing electro-magnetic radiation at two or more differing frequencies and generates a corresponding two or more radiometric signals. Radiometer 12 may include any circuitry that differentially compares radiometric signals at differing frequencies for determining brightness temperatures. In certain embodiments, radiometer 12 may be configured on a chip that is relatively small in size and configured to be powered by a portable electrical power source, such as a battery.

Antenna 14 may be any type that detects electro-magnetic radiation at differing frequencies for conversion to electrical signals suitable for processing by radiometer 12. Although antenna 14 shown comprises a spiral patch antenna, other types may also be implemented. For example, antenna 14 may comprise two or more stacked microstrip antennas, two or more meta-material antennas, two or more fractal based antennas, two or more dipole antennas, two or more notch antennas, two or more broadband microstrip antennas, two or more aperture-coupled printed antennas, or an array of patch antennas that receives electro-magnetic energy at two or more differing frequencies. As another example, antenna may include a single antenna having a bandwidth suitable for transmitting and receiving electro-magnetic radiation at multiple frequencies utilized by radiometer 12.

In certain embodiments, antenna 14 may be configured to convert electro-magnetic radiation at or approximately close to frequencies in the L-band of the electro-magnetic spectrum. In certain embodiments, antenna 14 may be configured to convert electro-magnetic radiation at or approximately close to frequencies in the very high frequency (VHF) band of the electro-magnetic spectrum. In certain embodiments, antenna 14 may be configured to convert electro-magnetic radiation at or approximately close to frequencies in the ultra high frequency band (UHF) band of the electro-magnetic spectrum. Electro-magnetic radiation in, or approximately close to the L-band, VHF band, and/or UHF band may have sufficient penetration depth to provide measurement of subsurface brightness temperatures. In certain embodiments, antenna 14 may convert electro-magnetic radiation at 700 Mega-Hertz and 1400 Mega-Hertz. In other embodiments, antenna 14 may convert electro-magnetic radiation at frequencies above or below 700 Mega-Hertz and/or 1400 Mega-Hertz.

Signal processor 16 processes radiometric signals from radiometer 12 representative of subsurface temperatures. In certain embodiments, signal processor may differentially combine radiometric signals to determine subsurface temperatures of features 26. For example, certain features 26 may emit radiation at elevated temperatures that varies relatively according to the frequency of the emitted radiation. Signal processor may detect the relative intensity of radiation received at differing frequencies and estimate the type and nature of the feature 26 according to the differential combination of electro-magnetic radiation at differing frequencies.

In certain embodiments, signal processor 16 may compare radiometric signals to an electro-magnetic propagation model to determine subsurface temperatures of features 26. The electro-magnetic propagation model may be a function of several factors, such as, but not limited to, dielectric properties of substrate 24, moisture content of substrate 24, resistivity of substrate 24, reluctance of substrate 24, and/or ambient temperature of substrate 24. For example, the electro-magnetic propagation model may include a mathematical function from which the values may be derived. Additionally, the electro-magnetic propagation model may include a table of values associated with certain known materials, such as dirt or regolith (i.e., a layer of loose material that may cover at least a portion of the surface of celestial objects, such as the Earth, the Moon, or other planetary bodies). Signal processor 16 may compare these values with received radiometric signals at differing frequencies to provide an estimate of the temperature of feature 26 based upon the measured brightness temperature at the two received frequencies, reference temperature (calibration) measurements, and/or knowledge of the soil characteristics.

Computing system 22 includes one or more processors and one or more memory units 18. A processor as described herein may include one or more microprocessors, controllers, or any other suitable computing devices or resources and may work, either alone or with other components of subsurface temperature measurement system 10, to provide a portion or all of the functionality of subsurface temperature measurement system 10 described herein. A memory unit 18 described herein may take the form of volatile and/or non-volatile memory including, without limitation, magnetic media, optical media, random access memory (RAM), read-only memory (ROM), removable media, or any other suitable memory component. A portion or all of memory units 18 may be remote from computing system 22, if appropriate.

Embodiments of signal processor 16 may include logic contained within a medium. Logic may include hardware, software, and/or other logic. The medium in which the logic is encoded may include a tangible medium. The logic may perform operations when executed by processor 20. Certain logic may include a computer program, software, computer executable instructions, and/or instructions capable being executed by computing system 22. The logic may also be embedded within any other suitable medium without departing from the scope of the disclosure.

The components of computing system 22 may be implemented using any suitable combination of software, firmware, and hardware. These components may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more servers, a server pool, one or more processors within these or other devices, or any other suitable processing device.

Certain embodiments of computing system 22 may include a single chip device in which memory 18 and processor 20 are monolithically formed on a common substrate. A computing system 22 such as this may operate in a self-contained manner to perform useful functions, such as storing brightness temperature measurements in its onboard memory 18 for retrieval at a later time via wireless or direct connection to remote station 42 (described above). Also, a computing system such as this may be relatively small in size and configured to operate in a hand-held housing with little or no external processing equipment.

Components of subsurface temperature measurement system 10 may be communicatively coupled with other computing systems via a network. The network facilitates wireless or wireline communication, and may communicate, for example, IP packets, Frame Relay frames, Asynchronous Transfer Mode (ATM) cells, voice, video, data, and other suitable information between network addresses. The network may include one or more LANs, radio access networks (RANs), metropolitan area networks (MANs), WANs, all or a portion of the global computer network known as the Internet, and/or any other communication system or systems at one or more locations.

In operation, signal processor 16 receives radiometric signals representing brightness temperatures at two or more frequencies when antenna 14 is placed adjacent the surface of substrate 24, and compares the two or more signals with one another to determine a brightness temperature at a depth of the substrate from antenna 14. In certain embodiments, signal processor 16 may determine a brightness temperature according to the relative signal strengths of the received radiometric signals. In certain embodiments, signal processor 16 may determine a brightness temperature by comparing the signal strengths of radiometric signals with an electro-magnetic propagation model associated with substrate 24.

Figure 2:
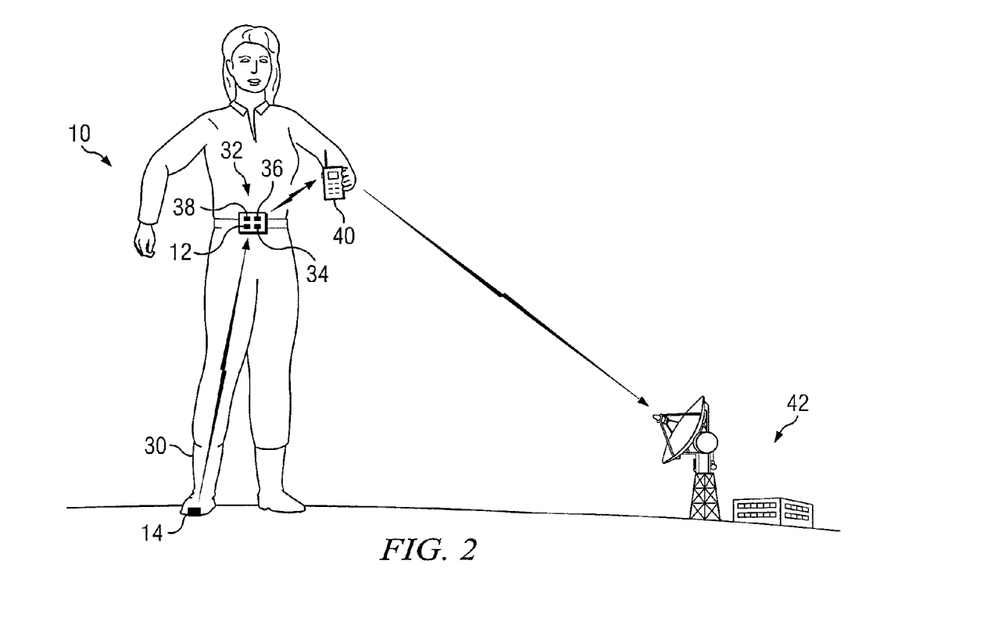
FIG. 2 illustrates an embodiment of the example subsurface temperature measurement system of FIG. 1 in which the antenna is configured in the sole of a shoe while the radiometer and the signal processor are worn on the belt of a user.

FIG. 2 illustrates an embodiment of the example subsurface temperature measurement system 10 of FIG. 1 in which antenna 14 is configured in the sole of a shoe 30 while radiometer 12 and signal processor 16 are worn on the belt of a user. Subsurface temperature measurement system 10 includes a housing 32 to house radiometer 12, a wireless receiver 34 to communicate wirelessly with a transmitter configured with antenna 14, a transmitter 36 to communicate wirelessly with a hand-held transceiver 40, and an onboard global positioning system (GPS) 38. As shown, housing 32 is configured on a belt of the user. In certain embodiments, radiometer 12 may be disposed on any portion of the user's body.

When worn by a user, the sole of shoe 30 may provide relatively close contact of antenna 14 to the surface of substrate 24, which in this case, is the Earth, to determine subsurface temperatures of certain subterranean features 26. Although disclosed for use in a shoe, antenna 14 may be implemented in any surface contacting device, such as a boot, a sandal, a loafer, a moccasin, a slipper, or a sock. In certain embodiments, antenna 14 may also be implemented on a surface contacting device, such as the end of a staff that may be handled by a user to place antenna 14 against the surface of substrate 24, such as the Earth.

Receiver 34 receives electrical signals from antenna 14, and transmits the received electrical signals to radiometer 12. Transmitter 36 receives radiometric signals from radiometer 12, and/or location information from GPS 38, and transmits the radiometric signals and/or location information wirelessly to hand-held transceiver 40. Hand-held transceiver 40 may function as a repeater to relay radiometric signals and/or location information to a remote station 42 for analysis. In certain embodiments, transmitter 36 may transmit radiometric signals and/or location information directly to remote station 42 without the use of hand-held transceiver 40.

In certain embodiments, transmitter 36 may include a digitizing circuit that converts radiometric signals from an analog form to a digitized form. Transmitter 36 and receiver 34 may communicate using any suitable type of wireless link. For example, transmitter 36 and receiver 34 may communicate using modulated radio frequency (RF) signaling, infrared signaling, or ultrasonic signaling techniques.

GPS 38 generates a position signal representative of the location of subsurface temperature measurement system 10. Thus, subsurface temperatures along with their associated location may be transmitted to remote station 42. In certain embodiments, remote station 42 may use the received subsurface temperature measurements/location information to construct three-dimensional imagery of subsurface temperatures in a particular region. Certain embodiments of subsurface temperature measurement system 10 may use other location technologies, including but not limited to assisted GPS, uplink time of arrival, Loran C, and time difference of arrival location determining systems.

In the particular embodiment shown, radiometer 12 wirelessly receives signals from antenna 12 using receiver 34. In certain embodiments, radiometer 12, GPS 38, and other associated elements may be implemented in shoe 30, such that housing 32 may be obviated.

As shown, subsurface temperature measurement system transmits radiometric signals from radiometer 12 and/or location information from GPS 38 to remote station in real-time. In certain embodiments, subsurface temperature measurement system 10 may include a data storage device, such as memory 18, for storing radiometric signals and/or location information for analysis at a later time.

In certain embodiments, location information provided by GPS 38 or other location device may be used to access location-specific data in an on-board database stored in memory 18 or stored in a memory located at remote station 42. The location-specific data may include soil characteristics derived from various sources such as those provided by the United States Department of Agriculture (USDA), or the National Aeronautics and Space Administration (NASA) if used on other planetary bodies. This information may be used along with pedotransfer functions to estimate the effective medium dielectric properties of the soil that are used in the electromagnetic model. Thus, location-specific data may be used to enhance accuracy of subsurface temperatures of features 26 in certain embodiments. The information provided by pedotransfer functions may include, but is not limited to the fraction of sand and clay, the bulk density and the particle density for different levels of water content.

Analyses performed to date, using an electro-magnetic model applicable to stratified dielectric layers, demonstrate that for low moisture conditions the difference in the observed brightness temperature at 700 Mega-Hertz and 1400 Mega-Hertz is nearly independent of the depth of the buried source under conditions typical of a subsurface fire. The significance of this result is that depth-dependence in the observed brightness temperature may be reduced, thus providing an accurate measurement of subsurface temperatures via the propagation model. Under higher moisture conditions, the observed brightness temperature at 1400 Mega-Hertz does not typically vary significantly from ambient temperatures. Thus, knowledge of higher moisture content may aid in the processing of the 700 Mega-Hertz data and may also enhance identification of heat sources beyond a given threshold.

Figure 3:
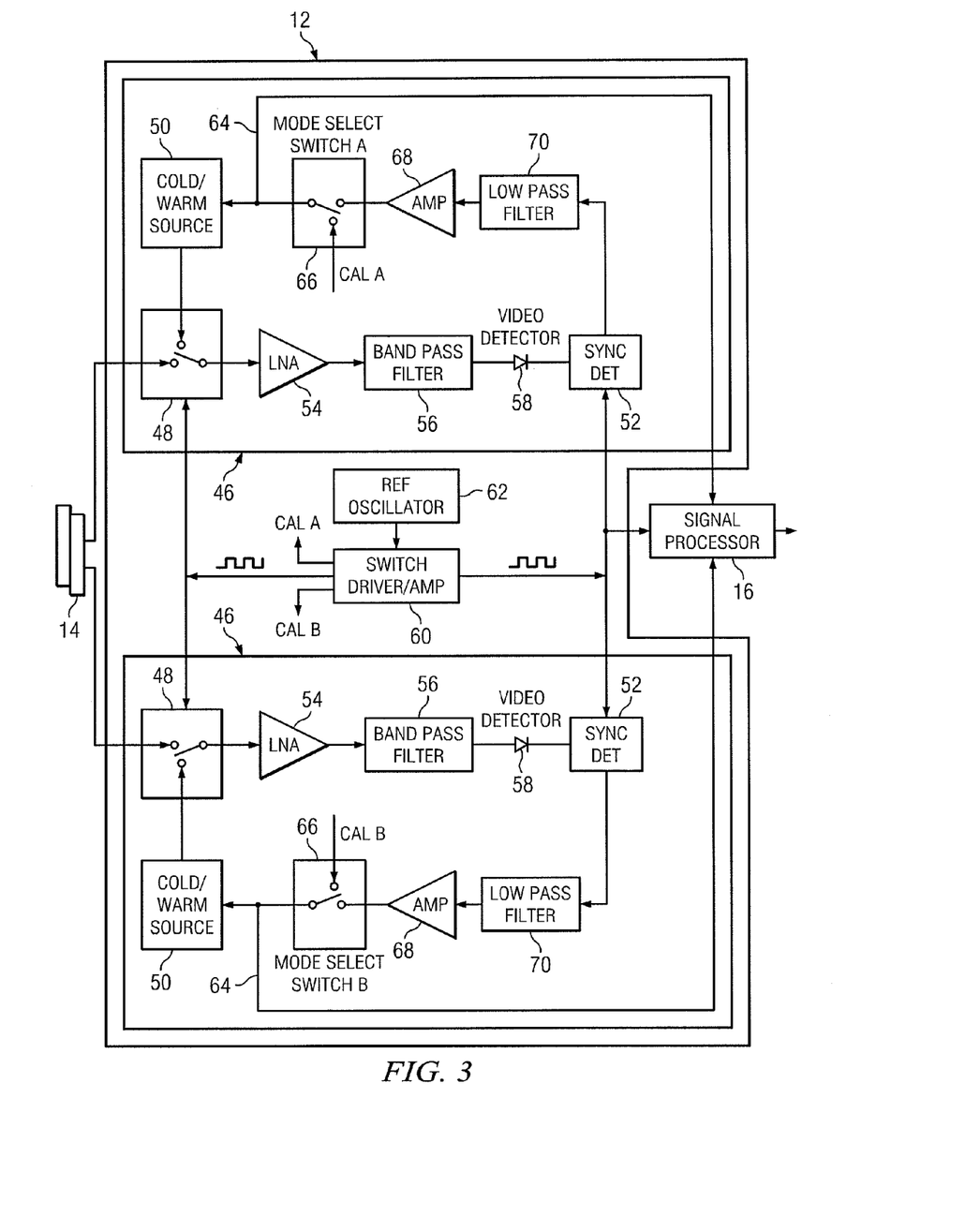
FIG. 3 illustrates an example schematic diagram of the antenna, the radiometer, and the signal processor of FIG. 1.

FIG. 3 illustrates an example schematic diagram of the antenna 14, radiometer 12, and signal processor 16 of FIG. 1. Radiometer 12 includes two individual radiometer sub-circuits 46. In certain embodiments, radiometer 12 may include three or more individual radiometer sub-circuits 46 that receive and process electrical signals at differing frequencies from antenna 14.

Radiometer 12 may include any quantity and type of radiometer sub-circuit 46 that receives and processes signals generated by antenna 14 at different frequencies. As shown, each radiometer sub-circuit 46 comprises a Dicke-type radiometer incorporating a switch 48 that alternatively couples a noise source 50 and antenna 14 to a synchronous detector 52 through a low-noise amplifier 54, a band-pass filter 56, and a video detector 58. A switch driver 60 is driven by a reference oscillator 62 to alternatively couple each switch 48 to either noise source 50 or its associated antenna 14 at a specified frequency whose time period is less than the anticipated drift of radiometer sub-circuits 46 over time. Each radiometer sub-circuit 46 may also include an amplifier 68 and a low pass filter 70 that selectively couples the output of sync detector 52 to noise source 50 via mode select switch 66.

In certain embodiments, each radiometer sub-circuit 46 may also include a feedback loop 64 that adjusts the energy supplied by its associated noise source 50 to be generally equivalent to the energy received from its associated antenna 14. In another embodiment, each radiometer sub-circuit 46 may also include a mode select switch 48 configured within the feedback loop 64 that alternates radiometer sub-circuits 46 between a closed-loop condition and an open-loop condition.

Figure 4:
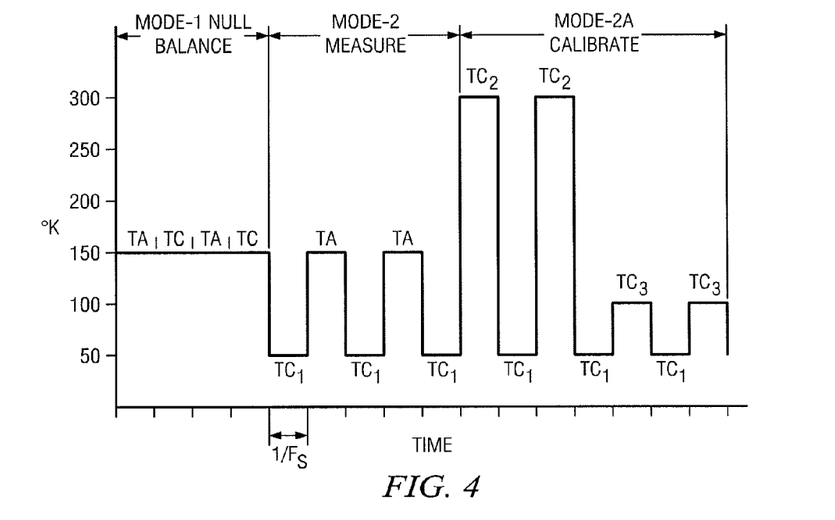
FIG. 4 illustrates a graphical example of how each radiometer sub-circuit of FIG. 3 may be operated in differing modes according to selective manipulation of the mode select switch of its respective radiometer sub-circuit.

FIG. 4 illustrates a graphical example of how each radiometer sub-circuit 46 of FIG. 3 may be operated in differing modes according to selective manipulation of the mode select switch 48 of its respective radiometer sub-circuit 46. Although three differing modes are shown and described, other operating and/or calibration modes may be implemented without departing from the spirit or scope of the disclosure. For example, each radiometer sub-circuit 46 may include a solid state noise source. As another example, one or more of radiometer sub-circuits 46 may be configured on another planetary body or may be configured as a sky sensor in a satellite that orbits the planetary body.

The term 'TA' refers to a brightness temperature value as received from antenna 14, the term 'TC' refers to a control temperature value received from noise source 50, and the terms 'TC1', 'TC2', and 'TC3' refer to multiple control temperature values received from noise source 50 at differing reference values. For example, control temperature value 'TC1' may be a temperature value approximating a brightness temperature close to the lower end of the measurement range of radiometer sub-circuit 46, control temperature value 'TC2' may be a temperature value approximating a brightness temperature close to the upper end of the measurement range of radiometer sub-circuit 46, and control temperature value 'TC3' may be a temperature value between control temperature value 'TC1' and 'TC2'.

In mode-1 of operation, radiometer sub-circuit 46 is operated in a closed-loop configuration such that energy delivered to synchronous detector 52 from antenna 14 and noise source 50 may be relatively equivalent. Each radiometer sub-circuit 46 may be operated mode-1 to null balance its respective feedback loop.

In mode-2 of operation, radiometer sub-circuit 46 is operated in an open-loop configuration such that brightness temperature values (TA) received from antenna 14 may be different from control temperatures (TC) received from noise source 50. In this particular mode of operation, brightness temperature values (TA) received from antenna 14 may be alternatively compared with control temperature value 'TC1' to derive an output brightness temperature of radiometer sub-circuit 46.

In mode-2A, radiometer sub-circuit 46 may be operated in the open-loop configuration in which multiple control temperature values (TC1, TC2, and TC3) may be compared to calibrate radiometer sub-circuit 46 over a dynamic range.

Modifications, additions, or omissions may be made to subsurface temperature measurement system 10 without departing from the scope of the disclosure. The components of subsurface temperature measurement system may be integrated or separated. For example, radiometer 12 may be fabricated independently of signal processor 16, or radiometer 12 may be integrally fabricated on the same substrate (printed wiring board (PWB) or microwave integrated circuit (MIC)) with which signal processor 16 is fabricated. Moreover, the operations of subsurface temperature measurement system 10 may be performed by more, fewer, or other components. For example, signal processor 16 may include other discrete components and/or algorithms that perform other useful functions, such as a real-time clock, for coordinating measured brightness temperature values according to their time of acquisition. Additionally, operations of signal processor 16 may be performed using any suitable logic comprising software, hardware, and/or other logic. As used in this document, "each" refers to each member of a set or each member of a subset of a set.

Figure 5:
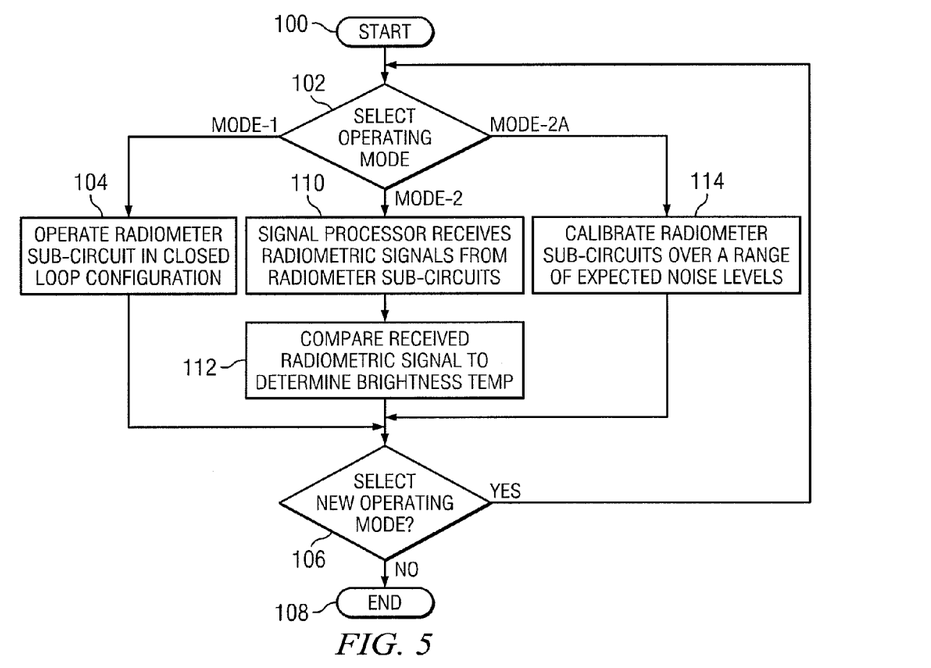
FIG. 5 illustrates an example method for receiving and processing radiometric signals from the radiometer of FIG. 1 to determine brightness temperatures below the surface of a substrate.

FIG. 5 illustrates an example method for receiving and processing radiometric signals from radiometer 12 to determine brightness temperatures below the surface of substrate 24. In act 100, the process is initiated.

In act 102, operation of radiometer sub-circuits 46 may be selected to operate in either the mode-1, mode-2, or mode-2A of operation. If radiometer sub-circuits 46 are selected for the mode-1 of operation, processing continues at act 104. If radiometer sub-circuits 46 are selected for the mode-2 of operation, processing continues at act 110. If radiometer sub-circuits 46 are selected for the mode-2A of operation, processing continues at 114.

In act 104, radiometer sub-circuits 46 may be operated in the closed loop configuration (mode-1) by actuating mode select switches 66. The mode-1 of operation generally refers to a closed loop configuration in which radiometer sub-circuits 46 are null balanced to the reference signal intensity levels of noise sources 50. Actuation of mode select switches provides a closed-loop feedback path from sync detector 52 to noise source 50. While in the mode-1 of operation, the gain of low noise amplifier 54 and/or bandpass filter 56 may be adjusted so that the signal intensity from noise source 50 and antenna 14 are relatively similar to one another. In this manner, the effective open loop gain of each radiometer sub-circuit 46 may be normalized to a standardized level approximating that of the output level of noise sources 50. Following null balancing of radiometer sub-circuit 46 in act 104, processing may continue at act 106.

In act 106, operation of radiometer sub-circuits 46 in other modes of operation may be continued at act 102, or processing may continue at act 108 in which the process is halted.

In act 110, radiometer sub-circuits 46 may be operated in the mode-1 of operation. The mode-2 of operation generally refers to an open loop configuration in which radiometric signals are obtained from antenna 14 for measuring subsurface temperatures. In the mode-1 of operation, radiometer sub-circuits 46 receive independent signals from each radiometer sub-circuits 46 while antenna 14 is placed adjacent to the surface of substrate 24. Each signal may be selected to have a center frequency that is different from one another. In certain embodiments, each signal may have a frequency in the L-band of the radio frequency spectrum. In certain embodiments, each signal may have a frequency in the UHF band of the radio frequency spectrum. In certain embodiments, each signal may have a frequency in the VHF band of the radio frequency spectrum.

In act 112, signal processor 16 may receive radiometric signals from radiometer sub-circuits 46 and compare the radiometric signals with one another to determine subsurface brightness temperatures. In certain embodiments, signal processor 16 may compare the relative intensities of the radiometric signals to determine subsurface brightness temperatures.

In certain embodiments, radiometric sub-circuits 46 may compare the radiometric signals with one another using an electro-magnetic propagation model. For example, a particular electro-magnetic propagation model may include a filtering function that models the attenuation that may be experienced by electro-magnetic radiation through common forms of subterranean mediums such as dirt. When radiometric signals are acquired from radiometer sub-circuits 46, this attenuation model may be applied to the resulting radiometric signals to compensate for estimated attenuation of the electro-magnetic signals through the type of subterranean medium from which subsurface measurements are taken.

Measurements of subsurface temperatures may continue by repeating acts 110 and 112 or radiometer sub-circuits 46 may be operated in other modes by continuing at act 106.

In act 114, radiometer sub-circuits 46 may be operated in the mode-2A of operation. The mode-2A of operation generally refers to an open loop configuration in which radiometer sub-circuits 46 may be calibrated over a range of expected noise levels that may be received by antenna 14. For example, as described with reference to FIG. 3, noise source 50 may be instructed to generate noise signals that approximate a brightness temperature (TC1) relatively close to the lower end of the measurement range of radiometer sub-circuit 46, a brightness temperature (TC2) relatively close to the upper end of the measurement range of radiometer sub-circuit 46, and a brightness temperature (TC3) relatively close to a median of the measurement range of radiometer sub-circuit 46.

Following calibration of radiometer sub-circuits 46, processing may continue at act 106 in which operation may revert to other modes of operation. Alternatively operation of subsurface temperature measurement system 10 may be halted in act 108.

Modifications, additions, or omissions may be made to the method without departing from the scope of the disclosure. The method may include more, fewer, or other acts. For example, any quantity and levels of brightness temperatures may be generated by noise sources 50 for calibrating radiometer sub-circuits 46 over its intended range of operation. For example, four or more brightness temperatures may be generated by noise sources 50 for calibrating radiometer sub-circuits 46 for operating within a particular brightness temperature range.

Although the present disclosure describes several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A temperature measurement system comprising:
    an antenna of a surface contacting device that is adapted to be placed adjacent to a surface of a substrate;
    a radiometer comprising at least two Dicke-type radiometer sub-circuits coupled to the antenna and each operable to generate a first signal representing a first electro-magnetic radiation signal at a first frequency and a second signal representing a second electro-magnetic radiation signal at a second frequency, the second frequency being different from the first frequency; and
    a signal processor coupled to the radiometer and operable to:
        receive the first signal and the second signal from the radiometer while the antenna is placed adjacent to the surface; and
        compare a first signal strength of the first signal to a second signal strength of the second signal using an electro-magnetic propagation model to determine a brightness temperature at a depth of the substrate from the antenna.

2. A temperature measurement system comprising:
    a radiometer coupled to an antenna and operable to generate a first signal representing a first electro-magnetic radiation signal at a first frequency and a second signal representing a second electro-magnetic radiation signal at a second frequency, the second frequency being is different from the first frequency; and
    a signal processor coupled to the radiometer and operable to:
        receive the first signal and the second signal from the radiometer while the antenna is placed adjacent to a surface of a substrate; and
        compare the first signal to the second signal to determine a brightness temperature of the substrate at a depth of the substrate from the antenna.

3. The temperature measurement system of claim 2, wherein the signal processor is operable to compare the first signal to the second signal by determining a difference in a signal strength of the first signal relative to the signal strength of the second signal.

4. The temperature measurement system of claim 2, wherein the signal processor is operable to compare the first signal to the second signal by comparing a first signal strength of the first signal and a second signal strength of the second signal using an electro-magnetic propagation model.

5. The temperature measurement system of claim 2, wherein the substrate is a celestial object and the antenna is configured in a surface contacting device adapted to be placed adjacent to the surface of the celestial object.

6. The temperature measurement system of claim 5, wherein the surface contacting device comprises one or more of the following:
    a boot;
    a sandal;
    a loafer;
    a moccasin;
    a slipper;
    a sock; and
    an end of a staff.

7. The temperature measurement system of claim 2, wherein the substrate comprises a man-made structure and the radiometer and the antenna are configured in a housing adapted to be placed adjacent to a surface of the man-made structure.

8. The temperature measurement system of claim 2, wherein the antenna comprises one or more of the following:
    a dual-band spiral patch antenna;
    a meta-material antenna;
    a stacked patch antenna;
    a fractal based antenna; and
    a dipole antenna.

9. The temperature measurement system of claim 2, wherein the antenna is operable to receive the first electro-magnetic radiation signal or the second electro-magnetic radiation signal in the L-band of the electro-magnetic spectrum.

10. The temperature measurement system of claim 2, wherein the antenna is operable to receive the first electro-magnetic radiation signal or the second electro-magnetic radiation signal in the ultra high frequency (UHF) band of the electro-magnetic spectrum.

11. The temperature measurement system of claim 2, wherein the antenna is operable to receive the first electro-magnetic radiation signal or the second electro-magnetic radiation signal in the very high frequency (VHF) band of the electro-magnetic spectrum.

12. The temperature measurement system of claim 2, wherein the radiometer comprises at least two Dicke-type radiometer sub-circuits.

13. The temperature measurement system of claim 2, wherein the signal processor is operable to receive the first signal and the second signal from the radiometer while the antenna is placed in contact with the surface.

14. A temperature measuring method comprising:
    receiving a first signal and a second signal from a radiometer while an antenna coupled to the radiometer is placed adjacent to a surface of a substrate, the antenna configured to generate the first signal representing a first electro-magnetic radiation signal at a first frequency and the second signal representing a second electro-magnetic radiation signal at a second frequency, the second frequency being different from the first frequency; and comparing the first signal to the second signal to determine a brightness temperature of the substrate at a depth of the substrate from the antenna.

15. The temperature measuring method of claim 14, wherein comparing the first signal to the second signal further comprises determining a difference in a signal strength of the first signal relative to the signal strength of the second signal.

16. The temperature measuring method of claim 14, wherein comparing the first signal to the second signal further comprises comparing a first signal strength of the first signal to a second signal strength of the second signal using an electro-magnetic propagation model.

17. The temperature measuring method of claim 14, further comprising:
placing a surface contacting device configured with the antenna adjacent to a celestial object, the celestial object comprising the substrate.

18. The temperature measuring method of claim 17, wherein the surface contacting device comprises one or more of the following:
a boot;
a sandal;
a loafer;
a moccasin;
a slipper;
a sock; and
an end of a staff.

19. The temperature measuring method of claim 14, further comprising:
placing a housing adjacent to a man-made structure, the housing configured to house the radiometer and the antenna.

20. The temperature measuring method of claim 14, wherein the antenna comprises one or more of the following:
a dual-band spiral patch antenna;
a meta-material antenna;
a stacked patch antenna;
a fractal based antenna; and
a dipole antenna.

21. The temperature measuring method of claim 14, further comprising:
receiving, by the antenna, the first electro-magnetic radiation signal or the second electro-magnetic radiation signal in the L-band of the electro-magnetic spectrum.

22. The temperature measuring method of claim 14, further comprising:
receiving, by the antenna, the first electro-magnetic radiation signal or the second electro-magnetic radiation signal in the ultra high frequency (UHF) band of the electro-magnetic spectrum.

23. The temperature measuring method of claim 14, further comprising:
receiving, by the antenna, the first electro-magnetic radiation signal or the second electro-magnetic radiation signal in the very high frequency (VHF) band of the electro-magnetic spectrum.

24. The temperature measuring method of claim 14, wherein the radiometer comprises at least two Dicke-type radiometer sub-circuits.

25. The temperature measurement method of claim 14, further comprising:
receiving the first signal and the second signal from the radiometer while the antenna is placed in contact with the surface.

* * * * *